United States Patent [19]
Grubb et al.

[11] Patent Number: 6,049,415
[45] Date of Patent: Apr. 11, 2000

[54] POLARIZATION MAINTAINING FIBER LASERS AND AMPLIFIERS

[75] Inventors: Stephen G. Grubb, Fremont; Paul Freeman, San Jose; Stuart MacCormack, Mountain View; Robert G. Waarts, Fremont, all of Calif.

[73] Assignee: SDL, Inc., San Jose, Calif.

[21] Appl. No.: 08/986,406

[22] Filed: Dec. 8, 1997

[51] Int. Cl.⁷ .................................................. H01S 03/10
[52] U.S. Cl. ................................. 359/341; 372/6; 385/11
[58] Field of Search ................................. 359/341; 372/6; 385/11

[56] References Cited

U.S. PATENT DOCUMENTS

| | | | |
|---|---|---|---|
| 5,050,183 | 9/1991 | Duling, III | 372/94 |
| 5,187,610 | 2/1993 | Habbab et al. | 359/341 |
| 5,263,036 | 11/1993 | De Bernardi et al. | 372/6 |
| 5,303,314 | 4/1994 | Duling, III et al. | 385/11 |
| 5,311,603 | 5/1994 | Fidric | 385/11 |
| 5,497,265 | 3/1996 | Fontana et al. | 359/341 |
| 5,506,723 | 4/1996 | Junginger | 359/341 |
| 5,563,733 | 10/1996 | Mitsuda et al. | 359/341 |
| 5,574,739 | 11/1996 | Carruthers et al. | 372/29 |

OTHER PUBLICATIONS

I.N. Duling III et al., Single–Polarisation Fibre Amplifier, Electronics Letters, 4th Jun. 1992, vol. 28, No. 12.

I. N. Dulling III et al., "Single–Polarization Fibre Amplifier", *Electronic Letters*, vol. 28 (12), pp. 1126–1128, Jun. 4, 1992.

*Primary Examiner*—Mark Hellner
*Attorney, Agent, or Firm*—Kudirka & Jobse, LLP

[57] ABSTRACT

A number of variations are provided of a device that provides an amplified single polarization optical signal. Each of these relies on the use of a non-polarization maintaining gain medium through which the signal is directed, and a polarization shifter and reflector that direct the signal back through the same gain medium with a shifted polarization state. An input polarization beamsplitter directs the returning optical signal away to an output, based on its shifted polarization state. The embodiments of the invention include the use of double-clad fiber. Multiple stages may be used to provide specific amplification parameters. In one embodiment, both amplification stages reside in the same polarization shifting optical path. A polarization maintaining amplifier of this type may be used as part of a master oscillator-power amplifier, in which polarization maintaining fiber is used as part of the source laser. Wavelength selective components are also used in certain embodiments of the invention, to allow for wavelength selectivity, as well as a single polarization state, in amplifiers, lasers and amplified spontaneous emission (ASE). In one embodiment, an optical circulator is used to allow the amplified, shifted polarization state signals to be directed away from the input to a desired output port. A feedback loop may also be used to control the polarization state at the amplifier output. A polarization beamsplitter at the output directs light not having the desired polarization state to a photodetector, the output of which is used by a polarization controller at the input, such that the input polarization state is adjusted until the control signal from the photodetector is minimized.

58 Claims, 6 Drawing Sheets

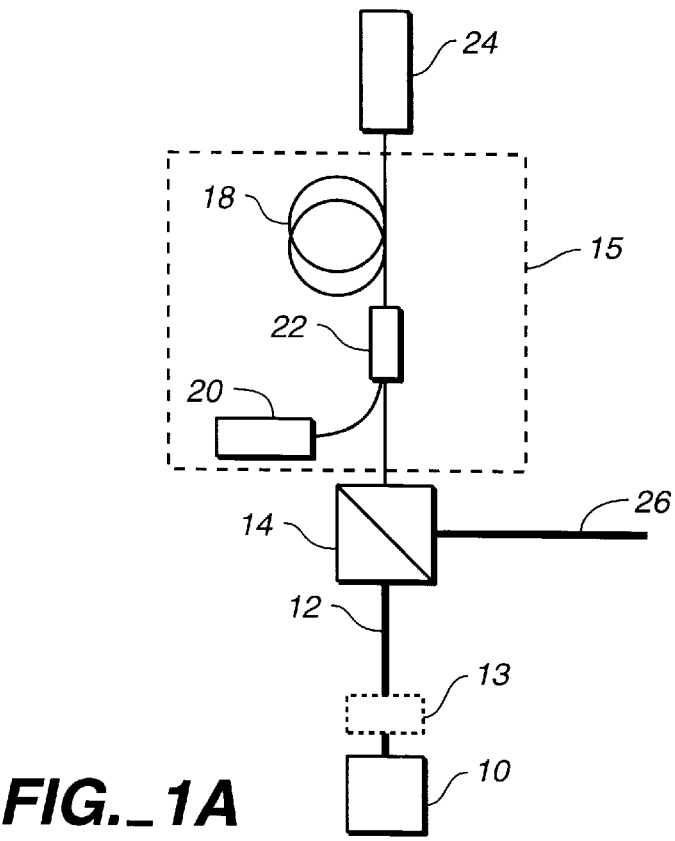
FIG._1A
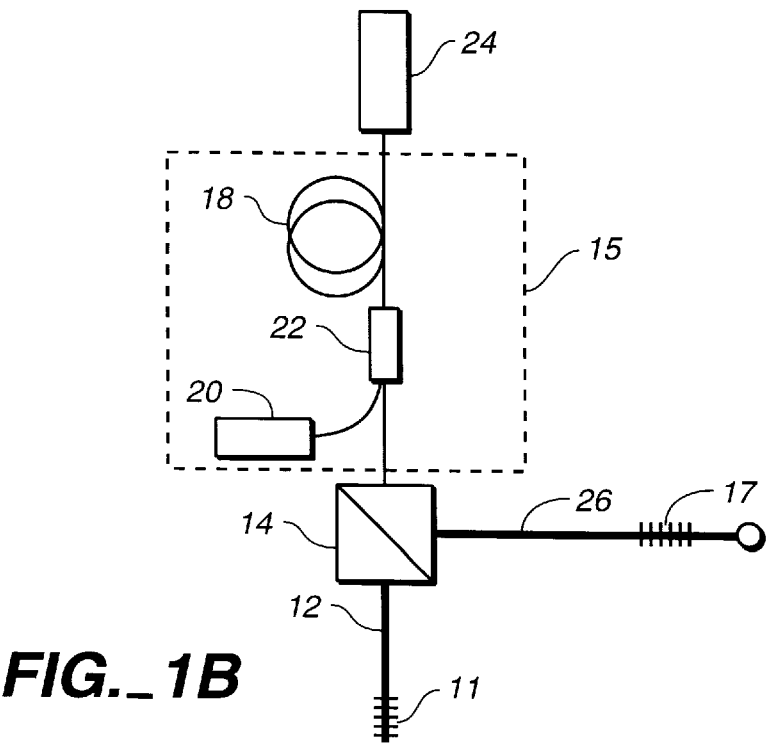
FIG._1B

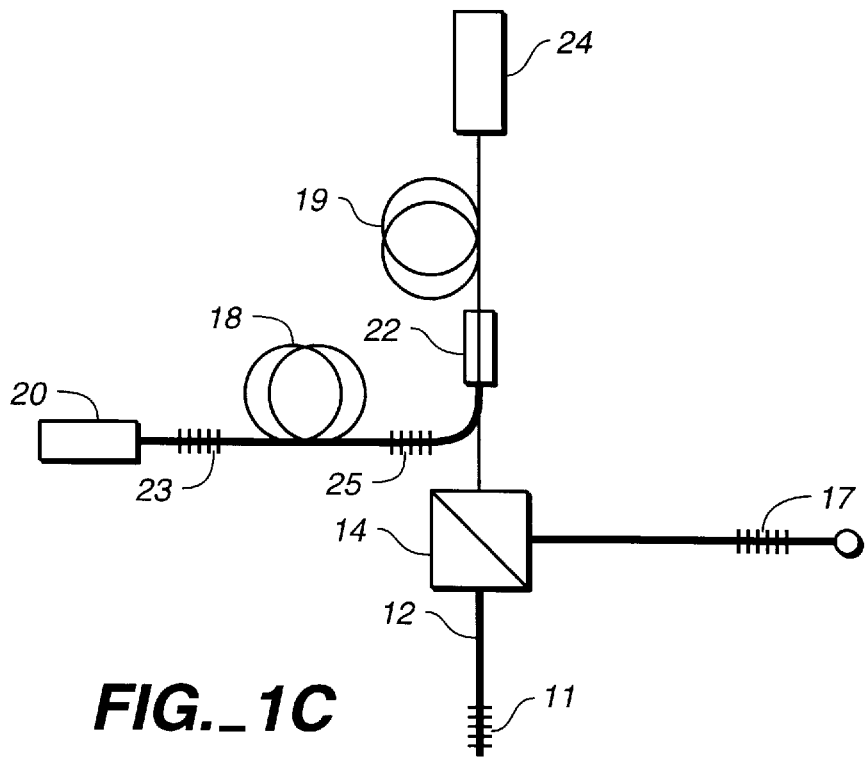
FIG._1C
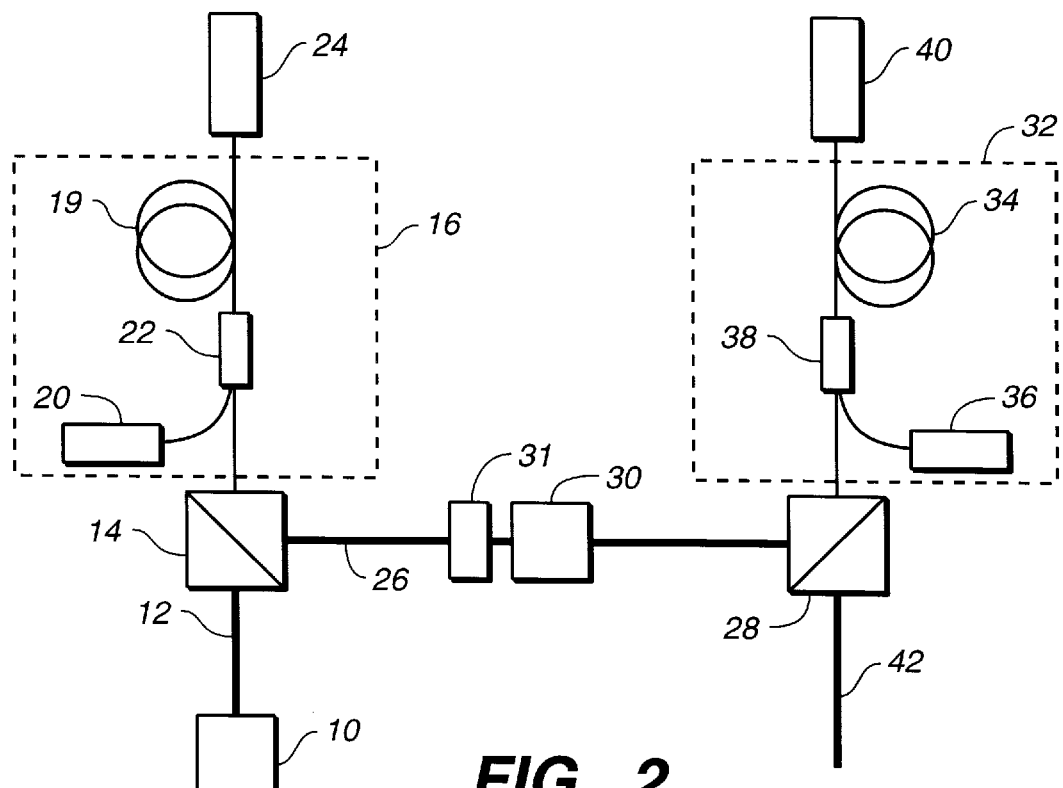
FIG._2

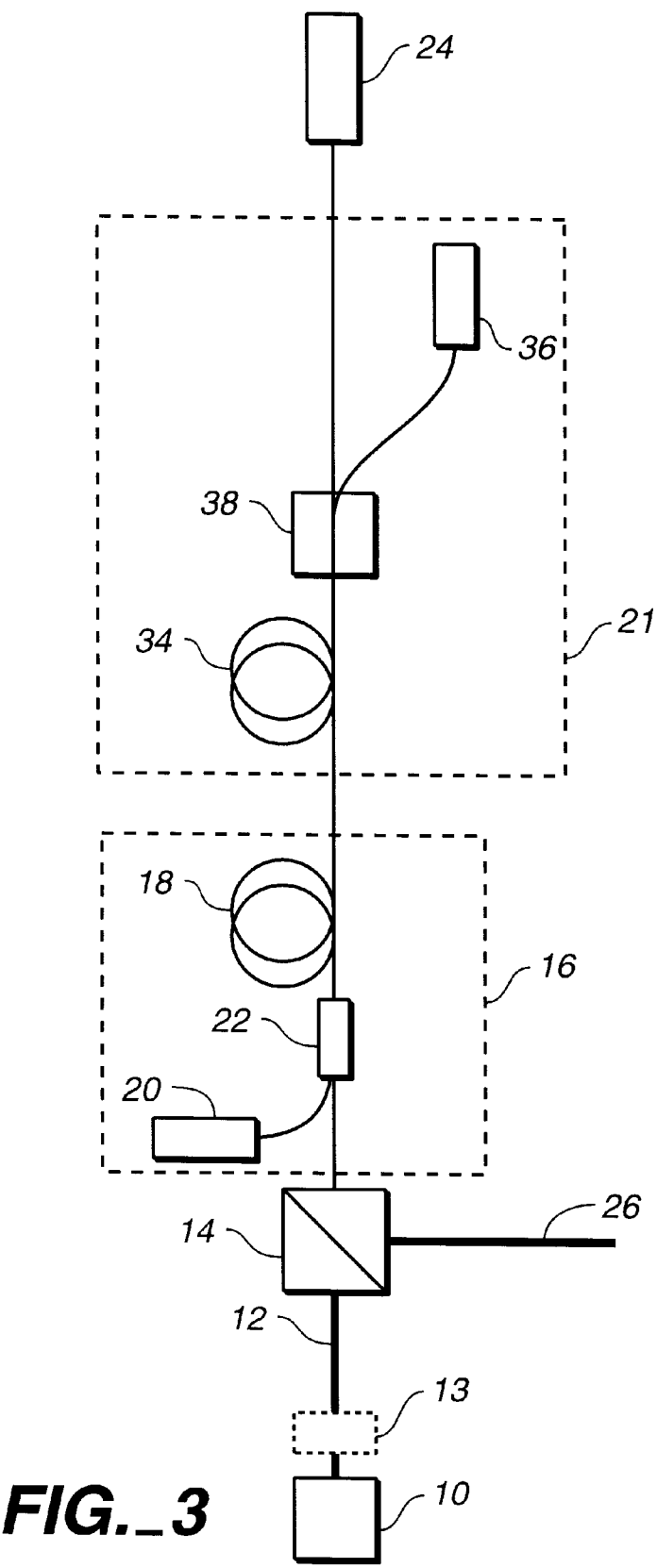
FIG._3

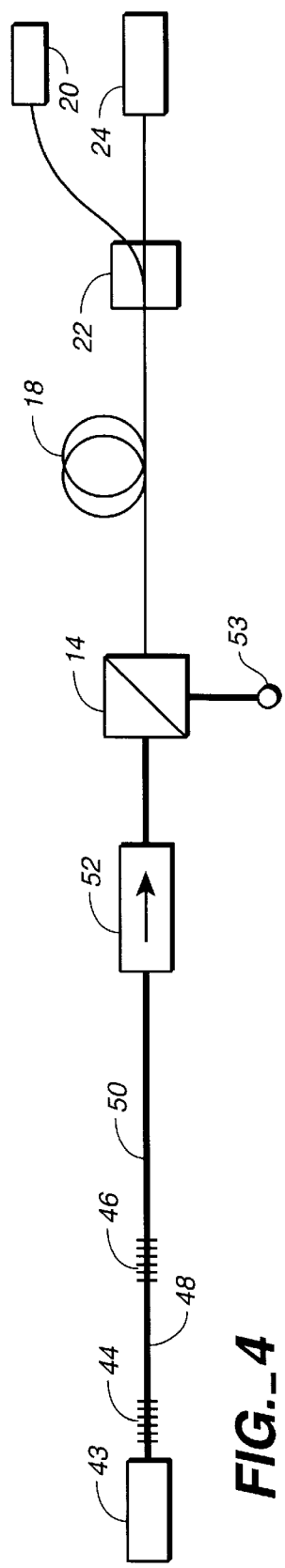
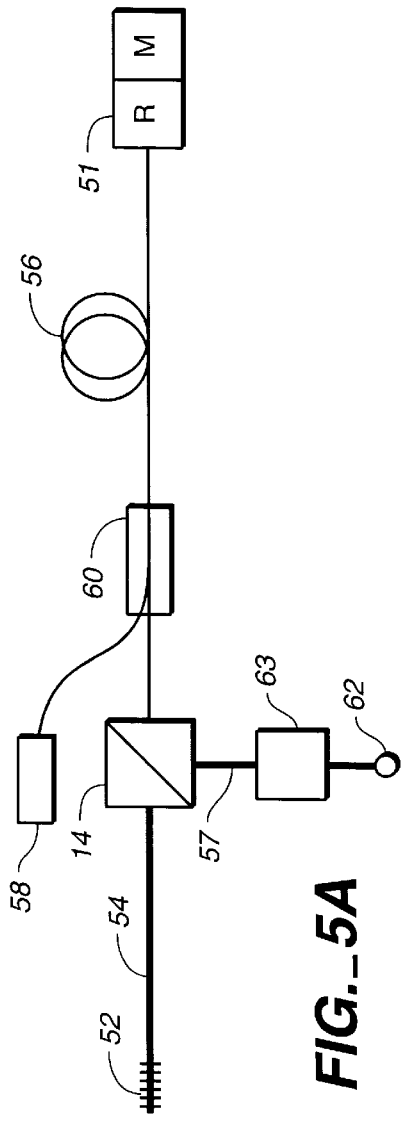
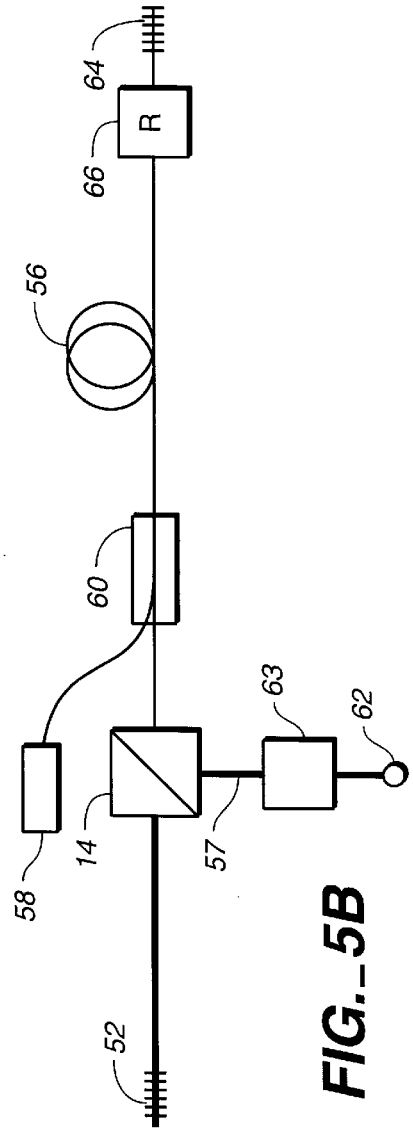
FIG._4
FIG._5A
FIG._5B

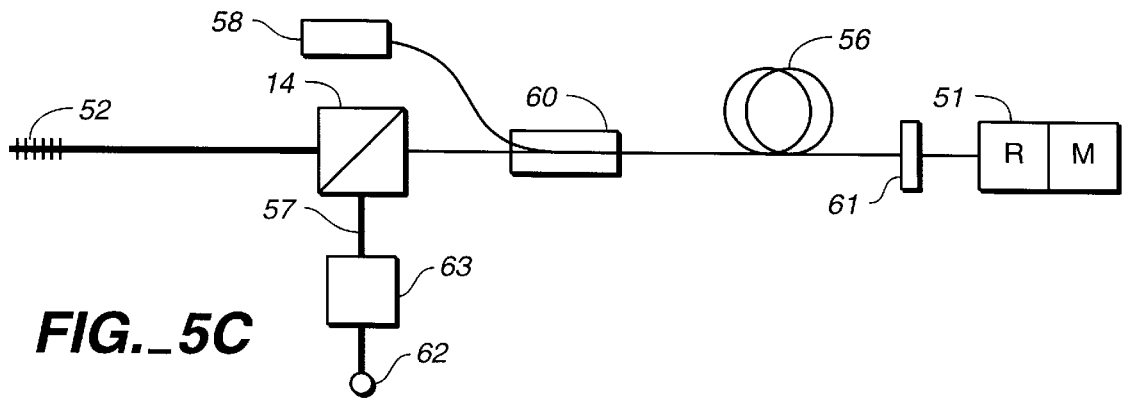
FIG._5C
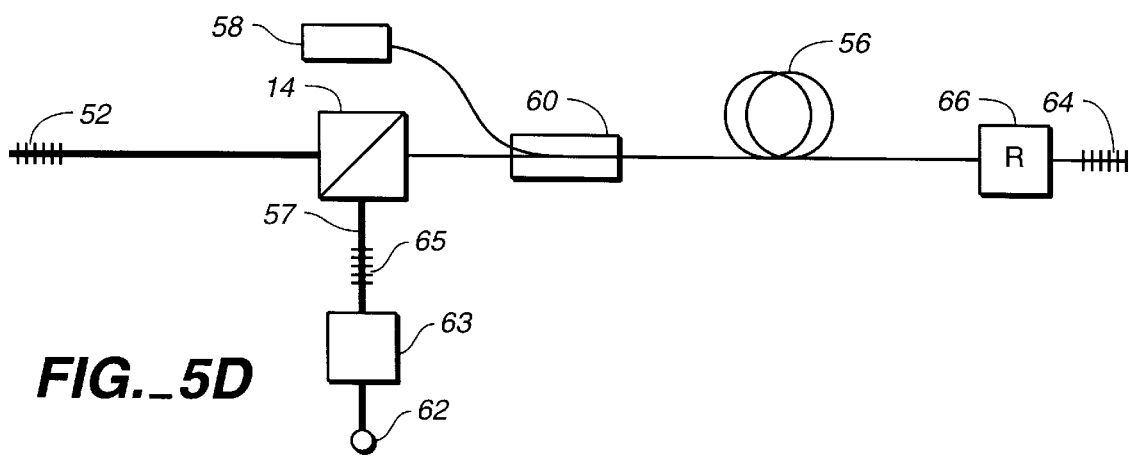
FIG._5D
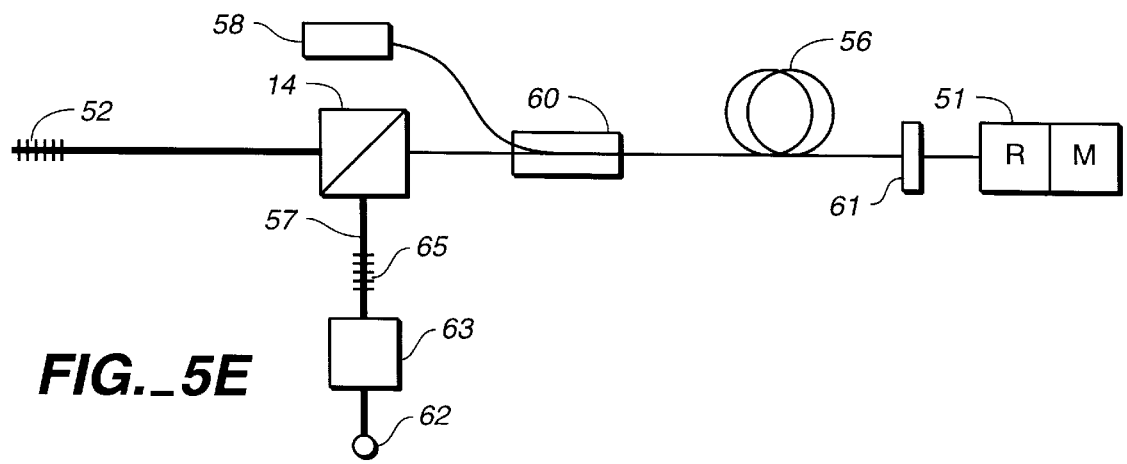
FIG._5E

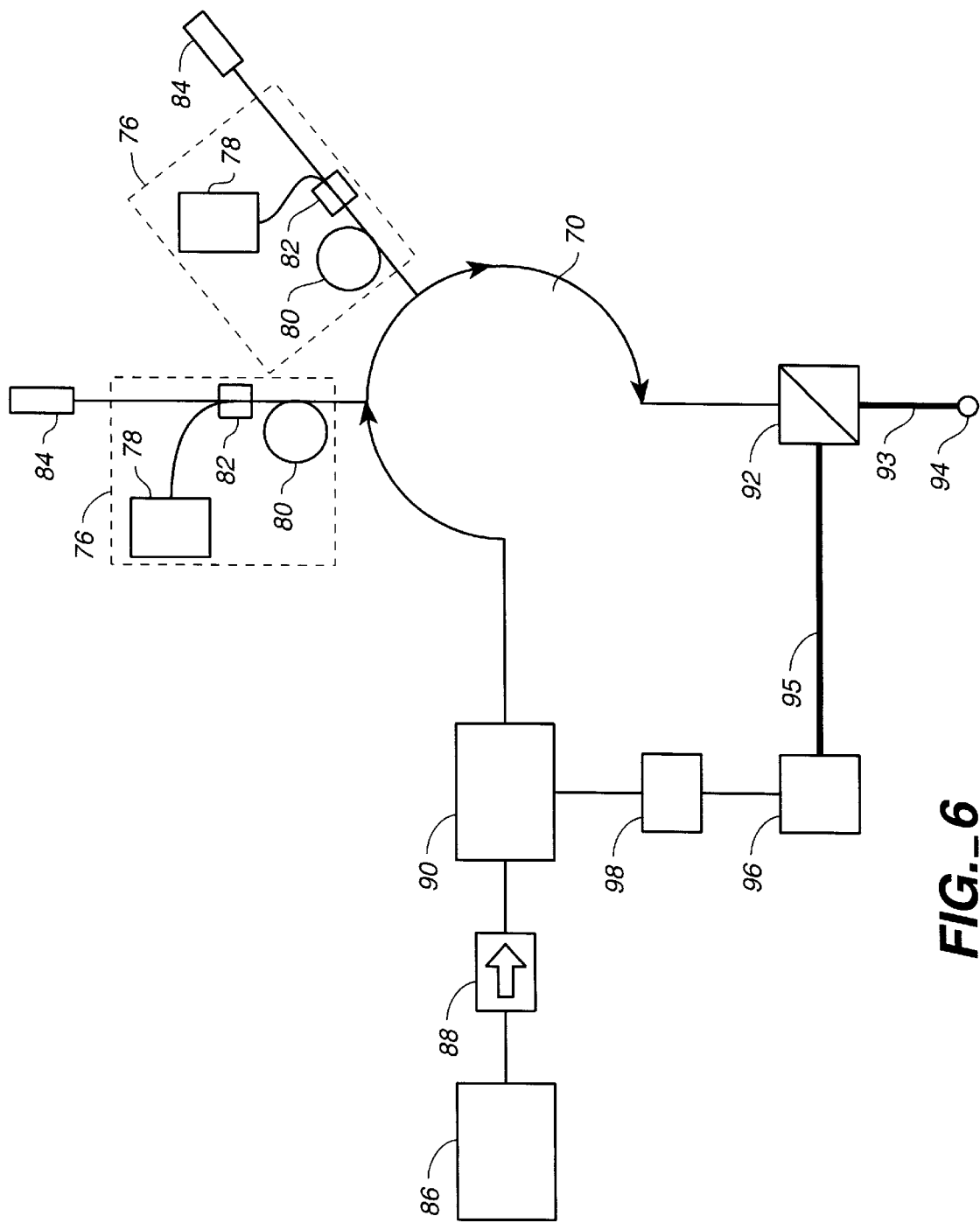
FIG._6

POLARIZATION MAINTAINING FIBER LASERS AND AMPLIFIERS

FIELD OF THE INVENTION

This invention relates generally to optical fiber lasers and amplifiers and, more particularly, to fiber lasers and amplifiers which produce a polarized output without requiring all polarization maintaining components.

BACKGROUND OF THE INVENTION

As is known in the art, an optical amplifier is a device that increases the amplitude of an input optical signal fed thereto. If the optical signal at the input to such an amplifier is monochromatic, the output will also be monochromatic, with the same frequency. A conventional optical amplifier comprises a gain medium, such as a single mode glass fiber having a core doped with a rare earth material, connected to a WDM coupler which provides low insertion loss at both the input signal and pump wavelengths. The input signal is provided, via the coupler, to the medium. Excitation occurs through optical pumping from the pumping source. Pump energy that is within the absorption band of the rare earth dopant is combined with the optical input signal within the coupler, and applied to the medium. The pump energy is absorbed by the gain medium, and the input signal is amplified by stimulated emission from the gain medium.

Such amplifiers are typically used in a variety of applications including, but not limited to, amplification of weak optical pulses such as those that have traveled through a long length of optical fiber in communication systems. Optical amplification can take place in a variety of materials including those materials, such as silica, from which optical fibers are formed. Thus, a signal propagating on a silica-based optical fiber can be introduced to a silica-based optical fiber amplifier, and amplified by coupling pump energy into the amplifier gain medium.

Fiber amplifiers are generally constructed by adding impurities to (i.e. "doping") an optical fiber. For a silica-based fiber, such dopants include the elements erbium and ytterbium. For example, one type of fiber amplifier referred to as an erbium (Er) amplifier typically includes a silica fiber having a single-mode core doped with erbium ions (conventionally denoted as $Er^{3+}$). It is well known that an erbium optical fiber amplifier operating in its standard so-called three level mode is capable, when pumped at a wavelength of 980 nanometers (nm), of amplifying optical signals having a wavelength of approximately 1550 nanometers (nm). Likewise, an amplifier having a silica-based fiber "co-doped" with erbium and ytterbium shows excellent amplification of a 1550 nm optical signal when pumped with a wavelength from about 980 nm to about 1100 nm. A particularly useful pump wavelength is 1060 nm because of the availability of high power solid state laser sources at about 1060 nm. Since 1550 nm is approximately the lowest loss wavelength of conventional single-mode glass fibers, these amplifiers are well-suited for inclusion in fiber systems that propagate optical signals in the wavelength vicinity of 1550 nm.

In certain applications, it is desirable to amplify, or generate, a polarized signal using a fiber amplifier or laser, respectively, while maintaining polarization of the optical signal at the output. While a high-birefringence, polarization maintaining fiber may be used, this fiber is difficult to manufacture and generally unavailable as a rare earth doped fiber. One method of providing polarization-maintaining optical amplification is disclosed in U.S. Pat. No. 5,303,314 to Duling III et al. This patent discloses the use of an amplifier having non-polarization maintaining fiber. A linearly polarized optical signal is directed through the amplifier fiber to a Faraday rotator mirror, where it is reflected, and the orientation of its polarization is shifted by 90%. While passing back through the amplifier fiber, any polarization changes caused by the fiber during the initial pass are undone. The reflected signal is thereafter directed to a polarization beamsplitter, where the polarization shift provided by the Faraday rotator mirror allows the returning signal to be separated from the input signal.

The Duling III, et al. prior art shows a useful and economical polarization maintaining fiber amplifier. However, it would be desirable to have a polarization maintaining optical amplifier or laser that uses non-polarization maintaining components that also provides for improved amplifier characteristics, such as lower noise figure. Thus, it is an object of this invention to provide linearly polarized fiber amplifiers and linearly polarized fiber lasers that have superior features than were previously available.

SUMMARY OF THE INVENTION

In accordance with the present invention, an amplified single-polarization optical signal may be provided using a number of different embodiments of the invention. A two-stage embodiment of the invention has a first, low-noise stage and a second, high power stage. Each stage uses a polarization separator to separate signals having different polarization states. In the preferred version of this embodiment, the polarization separators are polarization beamsplitters. The signal input to each stage has a polarization state that allows it to be transmitted through its respective polarization beamsplitter toward an optical gain medium. The dual stage format with the low noise first stage allows the single polarization amplifiers described herein to achieve significantly lower noise performance as to the amplifiers of Duling III et al. utilizing a single amplifier.

The optical gain medium in the first stage is a low noise amplifier, such as an erbium doped optical fiber amplifier, which may be pumped, for example, at a wavelength of 980 nm. The optical gain medium in the second stage is a high power amplifier, such as an erbium/ytterbium doped optical fiber amplifier, which may be pumped, for example, at a wavelength of 1060 nm. Other rare earth materials and pump wavelengths are, of course, possible, as is known in the art. In each stage, the optical signal passes through the amplifier, is amplified, and directed toward a polarization shifter and reflector, typically embodied in a Faraday rotator mirror. Each rotator mirror reflects the signal directed to it back toward its respective amplifier, while shifting the polarization state of the signal it reflects. Thus, in each stage the returning signal has a new polarization state, and is amplified again within the amplifier of that stage. Upon returning to its respective beamsplitter, each of the reflected signals, having a shifted polarization state, is directed out of the amplifier stage by its beamsplitter. In the first stage, the output signal from the beamsplitter is input to the second stage. When exiting the second stage, the output signal is directed to a system output port.

One embodiment of the invention has an amplifier using an optical fiber with multiple cladding layers (i.e. a "multi-clad" fiber) for a gain medium. Preferably, this fiber is a double-clad fiber. As with each of the stages of the above embodiment, the double-clad fiber gain medium is used with a polarization beamsplitter and a Faraday rotator mirror. The polarized input signal is directed by the polarization beamsplitter to the core of the double-clad fiber. The double clad fiber is pumped by optical pumping energy directed into the inner cladding of the fiber, and provides amplification of the optical signal that passes through its core. The amplified optical signal is reflected by, and has its polarization state shifted by, the Faraday rotator mirror. The signal is further amplified as it passes again through the double-clad fiber and, having a new polarization state, is directed to an output port by the beamsplitter.

The multi-clad fiber embodiment also applies to a fiber optic laser in which the multi-clad optical fiber is used as a medium for generating optical energy that resonates within a laser cavity. The resonator is formed by two gratings, one highly reflective grating positioned to reflect light returning from the Faraday rotator mirror that is transmitted through the polarization separator, and a second, partially-reflective grating positioned to receive optical energy returning from the Faraday rotator mirror that is reflected by the polarization separator. The partially-reflective grating functions as an output coupler for the laser, and reflects a sufficient amount of the energy that a laser cavity is developed between the two gratings. Light resonating in the cavity oscillates between the two gratings, reflecting off the Faraday rotator mirror, and changing polarization state in each pass through the cavity. Another variation of the polarization-maintaining optical amplifier uses either a single-mode or a double-clad amplifier fiber, but uses a double-clad optical fiber as part of the pumping source. The double-clad fiber is doped and is, itself, pumped by coupling optical energy within the gain spectrum of the doped fiber into the inner cladding of the fiber. The use of a double-clad fiber as a pump source allows for higher pump energies to be coupled into the amplifier than would otherwise be available.

In another embodiment of the invention, wavelength selective components are used with the configuration of polarization beamsplitter, optical gain medium and polarization shifter. The use of wavelength selective components to either side of the gain medium ensures that the wavelength of the energy that is isolated within the gain medium, and ultimately output via the beamsplitter, falls within a desired narrow bandwidth range. Thus, the output signal has both a desired polarization state and a desired wavelength. The wavelength selective elements may be periodic gratings, which reflect toward the gain medium only that light which is within the desired wavelength range. In one variation of this embodiment, the mirror reflector of a Faraday rotator mirror is replaced with such a grating, such that the functions of polarization shifting and narrow band reflection are combined. In another variation, a spectral filter is located in the optical path between the gain medium and a Faraday rotator mirror, and limits the wavelength of the energy that can reach the rotator mirror.

Other embodiments of the invention include a single polarization ASE source or source laser. In these embodiments, a polarization beamsplitter separates a wavelength selective grating and the pumped optical gain medium. A polarization maintaining waveguide is used with the grating, such that the only optical energy that can be reflected from the grating to the gain medium has a predetermined polarization state. To the opposite side of the gain medium is the polarization shifter and reflector. For optical energy output by the polarization beamsplitter, another polarization maintaining waveguide is used which maintains the single polarization state of the signal reflected from the reflector and redirected by the beamsplitter. Thus, pumping of the gain medium in this embodiment results in the generation of a single polarization narrow band output signal. In one variation of this embodiment, a wavelength selective component may also be used on the side of the gain medium away from the beamsplitter. This can be a spectral filter that is used to separate the gain medium from a Faraday rotator mirror, or a grating centered at the desired wavelength may be used to replace the mirror of a conventional Faraday rotator mirror.

In yet another embodiment of the invention, two amplifiers are used in a single polarization shifting path. A configuration is used that is similar to the embodiments described above, with a polarization beamsplitter and a Faraday rotator mirror, but more than one independently pumped gain medium separates the two. That is, the signal directed from the beamsplitter toward the rotator mirror is amplified twice in either direction, once by a first amplifier, and again by a second amplifier. In one version of this embodiment, each of the gain media includes a doped optical fiber. Each can be doped with a different material, such as erbium for one and erbium/ytterbium for the other. After being amplified by both amplifiers in either direction, the optical signal (with its polarization state shifted) is directed to an output as described in the aforementioned embodiments.

Still another embodiment of the invention functions as a single polarization master oscillator-power amplifier. A single polarization signal is generated using a pumped optical gain medium followed by a polarization maintaining waveguide. For example, a doped optical fiber amplifier may be used, and have its output wavelength defined by a grating pair, one highly reflective and one partially reflective, that serves as the output coupler. The partially reflective grating is preferably integrated directly into the polarization maintaining waveguide at the input. An isolator may be used to separate the polarization maintaining waveguide from a polarization beamsplitter of the amplifier. The remaining construction of the amplifier portion is similar to those described above, in that a pumped optical gain medium separates the beamsplitter on one side, and the polarization shifter and reflector on the other. The single polarization state output from the laser source is thus amplified further and, after its polarization state is shifted, is directed to an output port by the polarization beamsplitter.

One embodiment of the invention provides the polarization preserving qualities of the embodiments described above, but does not use a polarization beamsplitter. Instead, the single polarization input signal is directed into a first port of a unidirectional optical coupler, preferably an optical circulator. The circulator directs the signal to a second port, which is connected to a branch containing a pumped optical gain medium and a polarization shifter and reflector. Thus, the amplification and polarization shifting of this embodiment is accomplished as described above. However, rather than returning to a polarization beamsplitter, the amplified, polarization shifted signal returns to the optical circulator. As a one-directional optical element, the optical element, the circulator directs the returning optical signal to a third port of the circulator. The third port may be an output, or may be another branch with another amplification, polarization shifting arrangement.

In one variation of the above embodiment, a feedback apparatus may be used to control the polarization at the output of the amplifier. A polarization state detection apparatus monitors the signal directed out of the circulator. This apparatus may comprise a polarization beamsplitter and a photodetector. The beamsplitter is selected to direct light toward the photodetector that does not have the desired output polarization state. The photodetector, in turn, generates an electrical control signal that is provided to an input polarization controller that controls the polarization state of the signal directed to the first port of the circulator. The system is arranged such that the polarization controller modifies the polarization state of the signal input to the circulator until the control signal it detects is minimized.

BRIEF DESCRIPTION OF THE DRAWINGS

FIG. 1A is a schematic view of a polarization-maintaining fiber amplifier according to the present invention that uses a double-clad doped optical fiber.

FIG. 1B is a schematic view of a polarization-maintaining fiber laser similar to the fiber amplifier of FIG. 1A.

FIG. 1C is a schematic view of a polarization-maintaining amplifier that uses a double-clad fiber as part of a pump source.

FIG. 2 is a schematic view of a two-stage polarization-maintaining amplifier according to the present invention.

FIG. 3 is a schematic view of a polarization maintaining fiber amplifier according to the present invention that uses multiple stages in a single polarization-rotating branch.

FIG. 4 is a schematic view of a polarized fiber laser master oscillator-power amplifier (MOPA) according to the present invention.

FIG. 5A is a schematic view of a wavelength-selective, single-polarization ASE source according to the present invention that uses a chirped fiber Bragg grating 52 to form a cavity of a single polarization source laser.

FIG. 5B is a schematic view of an ASE source similar to that shown in FIG. 5A, but in which the mirror of the Faraday rotator mirror is replaced with a periodic grating that is highly reflective at a signal wavelength.

FIG. 5C is a schematic view of an embodiment similar to that of FIG. 5B, but which uses a transmissive wavelength selective component with the Faraday rotator mirror, rather than a reflective grating 64.

FIG. 5D is a schematic view of a single-polarization laser source similar to the ASE source of FIG. 5B.

FIG. 5E is a schematic view of a single-polarization laser source similar to the ASE source of FIG. 5C.

FIG. 6 is a schematic view of an alternative embodiment of the present invention that makes use of an optical circulator to allow repeated amplification of an input optical signal.

DETAILED DESCRIPTION OF THE PREFERRED EMBODIMENTS

Shown in FIG. 1A is a double-clad fiber amplifier which generates linearly polarized light. The optical signal input to the amplifier is provided by laser source 10 which, in the preferred embodiment, is a semiconductor laser diode. The signal output by source 10 has a primary laser wavelength of, for example, 1550 nanometers (nm). The optical signal is passed through optical isolator 13, which is a unidirectional optical element known in the art that prevents feedback of the signal to the optical source 10. From isolator 13, the optical signal is input to polarization beamsplitter 14 via polarization maintaining optical fiber 12. The fiber 12 is preferably of relatively short length, so as to help minimize the costs of the amplifier. In the preferred embodiment, beamsplitter 14 is a polished evanescent fiber coupler constructed such that light of a first polarization state exits the coupler 14 via a first path (e.g. within a first fiber), while light of a different polarization state exits through a different path (e.g. within a second fiber). Such beamsplitters are known in the art and commercially available.

As used herein, the term "state of polarization" or "polarization state" refers to any type of polarization, such as linear, elliptical or rotational, or a combination of different types of polarized light. Thus, either of these terms may be used to describe any type or types of combined or randomly dispersed polarization existing at any particular specified point along the path of propagating light. In the embodiment depicted in FIG. 1A, the state of polarization to be affected is a linear polarization. The "state of polarization" is changed in this embodiment by rotating the plane of linear polarization of the optical signal by a predetermined amount. However, those skilled in the art will recognize that the substance of this embodiment may be adapted to other types of polarization as well.

In the embodiment of FIG. 1A, the output from polarization beamsplitter 14 is coupled into the core of double-clad doped fiber 18, which is the gain medium for the fiber amplifier. The fiber 18 is a double-clad, non-polarization maintaining fiber doped with rare earth elements, and is the heart of fiber amplifier 15. In addition to receiving the optical signal from source 10, fiber 18 also receives pump energy from pump laser source 20. The pump energy is coupled into the inner cladding of fiber 18 via WDM 22.

The pumping source 20 is a high power, spatially multi-mode pump laser, and its output, after passing though WDM 22, is coupled into the inner cladding of the double-clad fiber 18. As is known in the art, given the pumping wavelength and the signal wavelength, an appropriately doped fiber 18 results in amplification of the optical signal at the expense of the pump energy. The pump energy is absorbed by the fiber, which then amplifies the signal energy passing through the core of the fiber 18 via stimulated emission. For example, for an optical signal having a wavelength of approximately 1550 nm, the coupling of pump energy having a wavelength in the range of 980 nm into the inner cladding of a fiber 18 doped with, e.g., erbium ($Er^{3+}$) will result in amplification of the 1550 nm optical signal directed through the fiber core. The output from fiber 18 is then directed to a Faraday rotator mirror 24.

While the description herein refers to a desired signal wavelength of 1550 nm, those skilled in the art will recognize that the invention may as easily apply to other desired signal wavelengths. For example, the fiber 18 could be doped with ytterbium (Yb), and pumped with optical energy in the range of 920 nm or 980 nm. Such a configuration would be particularly suitable to the amplification of a signal in the wavelength range of 1060–1120 nm. Other arrangements of doping materials, pumping wavelengths and signal wavelengths are also considered to be within the scope of the invention.

The Faraday rotator mirror 22 is a commercially available device that consists of a polarization shifting element and a planar reflector that reflects the laser energy back into the double-clad of fiber 18. The light passes through the polarization shifter twice, once before being reflected, and once after being reflected. In each direction, the polarization shifter of Faraday rotator mirror 24 rotates the plane of linear polarization of the optical signal by approximately 45%, such that the optical signal that returns through fiber 18 has undergone a polarization shift of approximately 90%. This polarization-shifted optical signal is further amplified by absorption of energy from the 980 nm pump signal in fiber 18 before exiting the fiber 18 and returning to beamsplitter 14.

The fiber amplifier 15 provides the 1550 nm optical signal with a significant amount of gain but, since it consists of non-polarization maintaining fiber, also causes a change in the polarization state of the signal. These "polarization scrambling" effects may affect different types of polarization in different ways. For example, the linear polarization of the signal may be rotated during its passage through the fiber. The optical signal returning through the fiber amplifier 15 extracts more energy from the amplifier 15. In addition, as the optical signal propagates back through the fiber amplifier, the polarization scrambling of the optical signal which occurred during its transmission from beamsplitter 14 to Faraday rotator mirror 24 is reversed. That is, passing the opposite direction back through the non-polarization preserving elements has an inverse effect on the polarization of the returning signal than that which was encountered during the initial propagation through the amplifier. As a result, the polarization scrambling caused by the fiber amplifier is undone, producing an amplified signal returning to beamsplitter 14 which is polarized, but for which the linear polarization is shifted 90%.

With the polarization state of the optical signal shifted by 90%, the optical signal is now reflected (rather than transmitted) by the polarization beamsplitter 14, which results in the optical signal exiting the beamsplitter through a different path than that through which it initially entered from optical source 10. Specifically, the signal is reflected by beamsplitter 14 into polarization-maintaining fiber 26, where it may be directed on to any subsequent application requiring a single polarization signal.

Shown in FIG. 1B is a single-polarization fiber laser that is very similar to the fiber amplifier of FIG. 1A. As with the amplifier of FIG. 1A, the laser of FIG. 1B has a double-clad doped optical fiber 18 that serves as a gain medium, and a Faraday rotator mirror 24 that receives optical energy from the gain medium 18, shifts its polarization, and reflects it back into the amplifier fiber 18. The fiber is pumped by coupling optical energy from pump source 20 (which is in the gain spectrum of the doped optical fiber 18) into the inner cladding of double-clad fiber 18 via WDM 22. Optical energy is developed within the gain medium, and energy which is within the narrow bandwidth reflected by gratings 11 and 17, and which has the single polarization state selected by polarization-maintaining fiber 12, begins to resonate between gratings 11 and 17. As optical energy is reflected from grating 11, it passes through fiber 12 and polarization beamsplitter 14 through the optical fiber 18. From amplifier fiber 18, the light is reflected by Faraday rotator mirror 24, and its polarization is shifted (typically by 90%). Thus, the returning optical energy has a different polarization state. This optical energy passes back through fiber 18 and WDM 22, reaching polarization beamsplitter 14 where the new polarization state results in its reflection to grating 17 via fiber 26. Since the grating 17 is partially-reflective at the wavelength of this optical energy, part of the energy is output through the grating, and part is reflected back into the amplifier, where it is again reflected, and its polarization state shifted, by Faraday rotator mirror 24. Back in its original polarization state, the optical energy may now pass back through polarization beamsplitter 14 and optical fiber 12 to grating 11. Thus, the resonant cavity is established between gratings 11 and 17.

The embodiment of FIG. 1C is very similar to that of FIG. 1B. However, the amplifier fiber 19 may or may not use a double-clad optical fiber. However, the amplifier is pumped using a fiber laser having a doped, double-clad optical fiber 18 as its gain medium. Optical source 20 is coupled into the inner cladding of fiber 18, thus providing the desired population inversion in the doped fiber 18. The output wavelength of the pump source using fiber 18 is controlled by highly reflective grating 23 and partially reflective grating 25. Optical energy having the desired pump wavelength is thereby coupled out through grating 25, and into amplifier fiber 19 via WDM 22. Use of a double-clad doped optical fiber as a pump source provides for higher pumping energies than would otherwise be available.

Shown in FIG. 2 is a schematic depiction of a two-stage single polarization amplifier according to the present invention. As with the previous embodiments, the type of polarization state with which FIG. 2 is concerned is a linear polarization. However, the concepts herein may be applied to other types of polarization as well. The first stage of the amplifier has the same construction as the embodiment of FIG. 1A, consisting of optical source 10, polarization-maintaining fiber 12, beamsplitter 14 and Faraday rotator mirror 24. However, in this embodiment, the amplifier 16 of the first stage uses a single-mode optical fiber 19 rather than a double-clad fiber. The fiber 19 is doped with erbium ($Er^{3+}$), and diode source 20 has an output wavelength of approximately 980 nm, which is coupled into the fiber 19 with 980/1550 WDM 22. The polarized output from the first stage, which is propagated along fiber 26 after reflection from beamsplitter 14, passes through optical isolator 30 to polarization beamsplitter 28. The isolator 30 is a known optical device that prevents the feedback of any light from the second stage of the amplifier to the first stage and, while not critical to the operation of this embodiment, is preferred. Also shown along fiber 26 is modulator 31. Modulator 31 may be any type of desired signal modulator, such as an intensity modulator, that allows a desired signal pattern to be introduced to the optical signal. Located the modulator 31 between the two stages has the advantage that the signal is modified prior to being introduced to the second, higher-power stage of the amplifier.

The polarization beamsplitter 28 is arranged such that polarized light reaching beamsplitter 28 along fiber 26 is reflected toward fiber amplifier 32, which is similar in construction to amplifier 16. However, unlike amplifier 16, fiber amplifier 32 uses an ErNb doped fiber 34, 1060/1550 WDM 38, and 1060 nm pumping source 36. After passing through fiber amplifier 32, the optical signal is reflected from Faraday rotator mirror 40 which changes the signal's state of polarization by imparting a 90% shift to it's plane of linear polarization. As with the first stage of the amplifier, passage of the optical signal back through fiber amplifier 32 undoes the polarization scrambling effects that were acquired en route to Faraday rotator mirror 40. Thus, the return signal reaching polarization beamsplitter 28 is polarized, but with a 90% shift in its plane of linear polarization relative to the signal initially input to the amplifier 32 from beamsplitter 28. Because of this shift in polarization, the signal passes through the beamsplitter 28 (rather than being reflected), and through polarization-maintaining fiber 42, after which it may be coupled to any desired output application.

In the embodiment of FIG. 2, the first stage amplifier fiber is erbium-doped and pumped with a 980 nm optical source, and has a particularly low noise figure. Since, traditionally, the bulk of the noise contribution in a two-stage amplifier comes from the first stage, the 980 nm pumped amplifier is used in the first stage as a low-noise stage, while the 1060 nm pumped Er/Yb fiber amplifier is used in the second stage as a high-power stage. Thus, this embodiment constitutes a low-noise, two-stage polarization maintaining amplifier. Having the amplifier separated into low-noise and high-power stages is particularly advantageous in this embodiment. The polarization unscrambling of each amplifier stage requires that the optical signal be directed back through the doped fiber in an opposite direction. In a single-stage amplifier, the signal returning through the fiber from the Faraday rotator mirror faces a depleted population inversion, due to energy absorbed during its initial pass through the fiber. This depleted inversion degrades the low-noise performance of the amplifier. However, since the noise figure of the two-stage amplifier of FIG. 2 is kept relatively low in the first stage, the population depletion is less, and the low-noise stage does not suffer these adverse effects. The second stage then provides the high power output and, having a preamplified signal as an input, does not suffer noise effects as severely as a single-stage amplifier having the same level of gain.

Depicted in FIG. 3 is a multi-stage polarization maintaining amplifier in which both amplifier stages are adjacent to each other and use the same Faraday rotator mirror. Amplifier stage 16 is the same as the first stage of the embodiment shown in FIG. 2, and includes pumping source 20, WDM 22 and doped optical fiber 19. A second amplifier stage 32, like the amplifier stage 32 of FIG. 2, has a pumping source 36, WDM 38 and doped optical fiber 34. However, rather than having its own branch between a polarization beamsplitter and a Faraday rotator mirror, the amplifier stage 32 of FIG. 3 shares these elements with amplifier stage 16. Thus, the optical signal transmitted through polarization beamsplitter 14 passes through WDM 22 and is amplified within pumped, doped optical fiber 18. The amplified signal is then directed into doped optical fiber 34, and is pumped by pumping source 36, which is coupled into the fiber 34 via WDM 38.

After exiting amplifier stage 21, the twice amplified optical signal is directed to Faraday rotator mirror 24, where it is reflected and its polarization is shifted by 90%, as described above. The optical signal then passes back through both amplifier stage 21 and amplifier stage 16, and is amplified again by each stage, before being output on fiber 26. As the signal returns through the two amplifier stages 16, 21, the polarization scrambling effects that were encountered while traveling toward the Faraday rotator mirror 24 are undone, such that the signal output on fiber 26 is a two-stage amplified, single-polarization optical signal.

Shown in FIG. 4 is single-polarization, double-clad master oscillator-power amplifier (MOPA). A conventional fiber master laser consists of a laser pump source 43, such as a laser diode, a highly reflective Bragg grating 44 and a chirped Bragg grating 46 which having, e.g., 10% reflectivity, acts as an output coupler. As an example, source 43 can be a laser diode having an output with a wavelength of 980 nm coupled to the core of fiber 48. In this embodiment, fiber 48 is a single mode fiber 48 doped with erbium, and is located between gratings 44 and 46. Alternatively, fiber 48 could be a double-clad fiber, in which case the pumping energy would be coupled into the inner cladding of the fiber. Gratings 44, 46 are selected to provide reflection of optical energy at a selected wavelength, such as 1550 nm. Grating 44 is highly reflective at the selected wavelength, and grating 46 is partially reflective at the selected wavelength, so as to provide the desired output coupling.

In the FIG. 4 embodiment, the output of the master laser is passed through a section of polarizing fiber 50. Preferably, Bragg grating 46 is embedded directly into the polarization maintaining fiber 50, although it may alternatively be located in fiber 48. Passing the light through polarizing fiber 50 produces a linearly polarized output. This polarized signal output from fiber segment 50 is thereafter directed through optical isolator 52, which prevents feedback from the power amplifier from returning to, and destabilizing, the master laser.

The output from isolator 52 is fed through polarization beamsplitter 14, which directs the optical signal into the core of rare earth doped, double-clad fiber 18. Pumping energy for the fiber is provided by optical pump source 20, which outputs optical energy at a wavelength suitable to pump the amplifier. For example, with a desired optical signal of 1550 nm, fiber 18 might be doped, e.g., with erbium, and the pump wavelength could be 980 nm. The pumping energy from source 20 is directed to the inner cladding of fiber 18 by WDM 22, and provides the pumping to the fiber necessary to allow amplification of the 1550 nm wavelength signal.

As a desired optical signal exits fiber 18, it is directed through WDM 16 to Faraday rotator mirror 22. The Faraday rotator mirror 22 imparts a 90% polarization shift to the optical signal and reflects it back through WDM 16 to fiber 18, where it is further amplified. The amplified optical signal returns to polarization beamsplitter 14. With the new polarization, the signal is reflected by the beamsplitter 14 to output port 53.

Shown in FIG. 5A is an embodiment of the present invention in which a Faraday rotator mirror 51 is used in conjunction with a fiber Bragg grating 52 as part of a polarized amplified spontaneous emission (ASE) source. A polarization maintaining fiber 54 ensures that the only light passing through the fiber 54 has its plane of linear polarization in a particular rotational orientation. Thus, the only light that can be directed from grating 52 to Faraday rotator mirror 51 has that particular polarization state. Light at a given polarization orientation is therefore reflected from grating 52 to Faraday rotator mirror 51, and is amplified as it passes through doped optical fiber 56. The fiber is pumped, via WDM 60, by optical pumping source 58, which has an output wavelength within the gain spectrum of the fiber 56. Optical signal energy having the initial polarization orientation output by polarization maintaining fiber 54 has its linear plane of polarization rotated by the Faraday rotator mirror 51 to a second, preferably orthogonal, polarization orientation. The second polarization orientation passes back through amplifier fiber 56, and is further amplified before being reflected by polarization beamsplitter 14 toward output port 62. The output signal is directed from beamsplitter 14 through polarization maintaining optical fiber 57. A modulator 63 may be used between the fiber 57 and the output port 62 to provide any desired modulation to the signal output at port 63.

The Faraday rotator mirror 51 is shown in two parts in FIG. 5A, so as to distinguish the polarization rotator portion from the mirror portion. This distinction is relevant in the embodiment of FIG. 5B, which is identical to that of FIG. 5A, except that the mirror portion of the Faraday rotator mirror is replaced with a narrow band highly reflective Bragg grating 64. The grating 64 may be incorporated into a short piece of optical fiber to which the signal from rotator 66 is coupled. This fiber may be a standard, non-polarization maintaining fiber, but is preferably short in length, so that no significant modification of the optical signal occurs between rotator 66 and grating 64. In this embodiment, the Faraday rotator 66 functions in the same manner as the rotator portion of Faraday rotator mirror 51 of FIG. 5A. However, by matching the wavelength selective characteristics of Bragg grating 52 and Bragg grating 64, the ASE source of FIG. 5B generates not only a single polarization signal, but one which has a narrow bandwidth as well. That is, the matched wavelength selective gratings determine the wavelength of the polarized optical energy that is output from the device.

Shown in FIG. 5C is an embodiment similar to that of FIG. 5B, but which uses a transmissive wavelength selective component with the Faraday rotator mirror, rather than the reflective grating 64 of FIG. 5B. As shown in FIG. 5C, a Faraday rotator mirror 50 is used that has a standard, preferably flat, mirror reflector. However, a wavelength selective condition at the rotator mirror end of the cavity is established by using a spectral filter 61 between the rotator mirror 50 and the amplifier fiber 56. This arrangement therefore has the same wavelength selective effect as the embodiment of FIG. 5B, but uses a standard Faraday rotator mirror 50.

Shown in FIG. 5D is an embodiment similar to that of FIG. 5B, but which uses an output coupler 65 to complete a laser cavity. In the preferred embodiment, the output coupler is a partially reflective Bragg grating which reflects optical energy in the same narrow wavelength range as grating 52. Thus, some of the optical energy which reaches the grating 65 is reflected back into the polarization maintaining amplifier to have its polarization twice rotated by Faraday rotator 66, and to be reflected by grating 64, such that it passes back to grating 52. Thus, grating 65 and grating 52 establish a resonant cavity for light having the desired polarization within the bandwidth of the gratings 52, 65. The output of this fiber laser passes through coupler 65, and may be modulated by modulator 63 prior to reaching output port 62.

Shown in FIG. 5E is fiber laser embodiment that is similar to the ASE source embodiment of FIG. 5C. However, unlike FIG. 5C, an output coupler 65 is provided which, together with grating 52, forms a resonant cavity passing through amplifier fiber 56. The output coupler 65 is preferably a partially-reflective Bragg grating that reflects light in the same narrow wavelength band as that reflected by grating 52. A portion of the light that resonates within the cavity formed by gratings 65 and 52 passes through grating 65. This output signal is a single-polarization, narrow-bandwidth optical signal, and may modulated by modulator 63 prior to being directed to output port 62.

Yet another alternative embodiment of the invention is shown in FIG. 6, and makes use of an optical circulator 70 to allow repeated amplification of an input optical signal in the branches of the optical circulator 70. Within each of the circulator branches is a fiber amplifier 76, which is essentially identical to the amplifier 16 of the FIG. 1A embodiment. Fiber amplifiers 76 each include an optical pumping source 78 coupled to a doped optical fiber 80 by a WDM 82. Each amplifier branch also includes a Faraday rotator mirror 84 which reflects the optical energy from the amplifier 76 back into the amplifier, while rotating its plane of linear polarization by approximately 90°. Operation of the amplifying device shown in FIG. 6 is described below.

An optical signal at a desired wavelength (e.g., 1550 nm) is generated by optical source 86, which may be a laser diode. The optical signal is directed through optical isolator 88, which prevents optical feedback from destabilizing the laser diode 86. From the isolator 88, the light passes through polarization controller 90, which is an adjustable polarization shifter, such as a liquid crystal or lithium niobate device. The polarization controller imparts a rotational shift in the plane of linear polarization to the light passing through it, the extent of the shift being externally controllable.

The optical signal exiting the polarization controller 90 passes into the first branch of the optical circulator, and is amplified by fiber amplifier 76 both before and after being retroreflected by Faraday rotator mirror 84, which also imparts a 90° polarization rotation to the reflected signal. The amplified, polarization-shifted light exits the first branch and is directed to the second branch, where it undergoes the same steps of amplification and polarization rotation. The light then exits optical circulator 70 and is directed to polarization beamsplitter 92.

Beamsplitter 92 is selected such that the relative rotation of polarization that passes through the beamsplitter to output port 94 is that which would be expected, given the input polarization of the light from optical source 82 and the expected rotations of that polarization due to the Faraday rotator mirrors in the branches of the optical circulator 70. For example, given the arrangement shown in FIG. 6, light exiting optical circulator 70 would be expected to have a plane of linear polarization that was shifted 1800 relative to the input polarization of the optical signal from source 86 (assuming no polarization shift was imparted by polarization shifter 90). In such a case, substantially all of the optical signal exiting optical circulator 70 would pass through beamsplitter 92 to output port 94. However, as described below, polarization scrambling effects can be introduced by the optical circulator 70 and other portions of the apparatus, and can cause an unexpected degree of polarization rotation, which is controlled herein by using a feedback signal to adjust polarization controller 90.

Polarization beamsplitter 92 transmits light having the desired polarization rotation, and reflects light having an orthogonal rotational polarization. The light that is transmitted through the beamsplitter 92 is directed to output port 94 by polarization maintaining fiber 93, which is oriented to have low loss at the desired polarization. Likewise, light that is reflected by polarization beamsplitter 92 is directed through polarization maintaining optical fiber 95, which has a minimum loss characteristic for light having the orthogonal polarization rotation. This light is directed from fiber 95 to photodetector 96. Photodetector 96 generates an electrical output to control unit 98, the magnitude of which is proportional to the intensity of the light received along fiber 95. Control unit 98 is a known commercial control element, and provides an electrical input to polarization controller 90, the magnitude of which determines the rotational shift in linear polarization imparted by the polarization controller 90 to the input signal received from isolator 88. The control unit 98 adjusts the polarization controller 90 until the input it receives from the photodetector is a minimum. Thus, the feedback of the system forces the polarization controller to compensate for any rotation of the plane of linear polarization of the signal introduced by the rest of the system. Thus, the portion of the output signal having the desired linear polarization (i.e., that which is transmitted through beamsplitter 92) is maximized.

The arrangement of FIG. 6 allows for multiple stages of amplification using nonpolarization maintaining elements, while still providing a single polarization output. Although FIG. 6 shows an amplifier 76 and a Faraday rotator mirror 84 in only two branches of optical circulator 70, those skilled in the art will recognize that any desired number of amplifiers 76 and Faraday rotator mirrors 84 may be used in separate branches, up to the capacity of the optical circulator 70. Depending on the overall polarization shift the various arms would be expected to impart, the relative polarization-sensitive characteristics of the polarization beamsplitter 92 would be selected accordingly.

While the invention has been shown and described with reference to a preferred embodiment thereof, it will be recognized by those skilled in the art that various changes in form and detail may be made herein without departing from the spirit and scope of the invention as defined by the appended claims.

What is claimed is:

1. An optical amplifier comprising:
    a first stage polarization separator that receives an input optical signal along an input path, the optical signal having a polarization state which results in its being directed along a first path by the first stage polarization separator;
    a first stage optical gain medium along the first path that amplifies the optical signal, the first stage gain medium having a relatively low noise figure;
    a first stage reflector that reflects the amplified first path optical signal back through the first gain medium;
    a first stage polarization shifter that changes the state of polarization of the first path optical signal by a predetermined amount such that upon return of the optical signal to the first stage polarization separator, the optical signal follows a second path out of the first stage polarization separator;
    a second stage polarization separator that receives the optical signal output along the second path and directs it along a second stage amplifier path;
    a second stage optical gain medium along the second stage amplifier path that amplifies the optical signal, the second stage gain medium having a relatively power output;
    a second stage reflector that reflects the optical signal back through the second stage gain medium; and
    a second stage polarization shifter that changes the state of polarization of the optical signal by a predetermined amount, such that upon return of the optical signal to the second stage polarization separator the optical signal follows an output path from said second stage polarization separator.

2. An optical amplifier according to claim 1 wherein the first stage reflector and first stage polarization shifter together comprise a Faraday rotator mirror.

3. An optical amplifier according to claim 1 wherein the input path comprises a polarization maintaining optical fiber.

4. An optical amplifier according to claim 1 wherein the second path comprises a polarization maintaining optical fiber.

5. An optical amplifier according to claim 1 wherein the output path comprises a polarization maintaining optical fiber.

6. An optical amplifier according to claim 1 wherein the polarization state of the input signal is a linear polarization state, and wherein the polarization shifter rotates the plane of linear polarization of the amplified first path optical signal by approximately 90%.

7. An optical amplifier according to claim 1 wherein the optical signal has a wavelength of approximately 1550 nm.

8. An optical amplifier according to claim 7 wherein the first stage gain medium comprises an erbium doped fiber amplifier with a pumping source having a wavelength of approximately 980 nm.

9. An optical amplifier according to claim 7 wherein the second stage gain medium comprises an erbium/ytterbium doped fiber amplifier with a pumping source having a wavelength of approximately 1060 nm.

10. An optical amplifier according to claim 1 further comprising an optical isolator located along the second path.

11. An optical amplifier according to claim 1 wherein the first gain medium and the second gain medium each comprise non-polarization preserving components.

12. The optical amplifier according to claim 1 wherein said first stage polarization separator is a polarization beamsplitter.

13. An optical amplifier according to claim 1 further comprising a modulator along the second path for modulating the optical signal.

14. An optical apparatus for outputting an amplified optical signal, the signal comprising a first wavelength and having a first linear polarization, the amplifier comprising:
    a polarization separator in the path of the optical signal that directs signals having the first linear polarization along a first signal path, and directs signals having a second linear polarization, different from the first polarization, along a second signal path;
    an optical gain medium that receives and amplifies the optical signal with energy from a pumping source;
    a reflector that receives the optical signal from the gain medium and reflects the optical signal back through the gain medium;
    a polarization shifter that shifts the linear polarization of the optical signal a predetermined amount such that, when directed toward the reflector from the polarization separator, the optical signal has said first linear polarization, and when directed away from the reflector toward the polarization separator, the optical signal has said second polarization; and
    a wavelength selective component that limits the optical signal to a relatively narrow bandwidth, the wavelength selective component being located, relative to the polarization separator in a common optical path with the polarization shifter, such that optical energy traveling in the common optical path from the polarization separator encounters both the polarization shifter and the wavelength selective component before again encountering the polarization separator.

15. An apparatus according to claim 14 further comprising a polarization maintaining waveguide in the first signal path.

16. An apparatus according to claim 14 further comprising a polarization maintaining waveguide in the second signal path.

17. An apparatus according to claim 14 wherein the wavelength selective component is a first wavelength selective component located to a first optical side of the gain medium, and wherein the apparatus further comprises a second wavelength selective component located in the path of the optical signal to a second optical side of the gain medium away from the first optical side, said second wavelength selective component also limiting the optical signal to substantially only said relatively narrow bandwidth.

18. An apparatus according to claim 17 wherein the second wavelength selective component comprises a spectral filter through which the optical signal passes.

19. An apparatus according to claim 18 further comprising a partially reflective output coupler in the second signal path that partially reflects optical energy at the first wavelength back along the second signal path toward the polarization separator.

20. An apparatus according to claim 17 wherein then reflector comprises a periodic grating that reflects optical energy in substantially only the relatively narrow bandwidth.

21. An apparatus according to claim 20 further comprising a partially reflective output coupler in the second signal path that partially reflects optical energy at the first wavelength back along the second signal path toward the polarization separator.

22. An optical signal generation apparatus for generating and outputting an optical signal, the apparatus comprising:
- an optical gain medium in which optical energy at the wavelength of the optical signal is generated with energy from a pumping source;
- a wavelength selective component that directs optical energy within a narrow band of wavelengths including the first wavelength toward the optical gain medium;
- a first polarization maintaining waveguide located in an optical path between the wavelength selective component and the optical gain medium, the polarization maintaining waveguide restricting the optical energy reaching the gain medium from the wavelength selective component to a first linear polarization;
- a reflector on the optically opposite side of the gain medium from the polarization separator that reflects the optical energy reaching it from the gain medium back toward the gain medium;
- a polarization shifter on the same optical side of the gain medium as the reflector that shifts the linear polarization of the optical energy reaching it by a predetermined amount, such that optical energy having the first linear polarization that reaches the polarization shifter leaves with a second linear polarization different than the first linear polarization;
- a polarization separator that directs optical energy having the first linear polarization toward the wavelength selective component, and directs optical energy having the second linear polarization along an output path; and
- a second polarization maintaining waveguide located in the optical path between the polarization separator and an output port of the system, the second polarization maintaining waveguide directing substantially all the optical energy reaching it that has the second linear polarization to a system output port, while preventing optical energy not having the second linear polarization from reaching the output port.

23. An apparatus according to claim 22 wherein the reflector and the polarization shifter comprise a Faraday rotator mirror.

24. An apparatus according to claim 22 wherein the wavelength selective component comprises a periodic grating.

25. An apparatus according to claim 22 wherein the polarization separator comprises a polarization beamsplitter.

26. An apparatus according to claim 22 wherein the first polarization maintaining waveguide comprises a polarization maintaining optical fiber.

27. An apparatus according to claim 22 wherein the second polarization maintaining waveguide comprises a polarization maintaining optical fiber.

28. An apparatus according to claim 22 wherein there is substantially no reflection of the optical energy passing through the second polarization maintaining waveguide back toward the polarization separator.

29. An apparatus according to claim 22 wherein the reflector is a wavelength selective reflector such that it reflects only light within a narrow band of wavelengths including the first wavelength.

30. An apparatus according to claim 22 further comprising a modulator located in an optical path between the second polarization maintaining waveguide and the output port that allows modulation of the optical signal.

31. An optical amplifier for amplifying an optical signal from an optical signal source, the signal comprising a first wavelength and having a first polarization state, the amplifier comprising:
- a polarization separator that directs signals having the first polarization state along a first signal path, and directs signals having a second polarization state, different from the first polarization, along a second signal path;
- a first optical gain medium having a first pumping source, the gain medium receiving and amplifying optical energy along the first signal path;
- a second optical gain medium that has a second pumping source and that is adjacent to the first optical gain medium along the first signal path, the second gain medium receiving and amplifying optical energy;
- a reflector that is located in the first signal path to a side of the optical gain media away from the polarization separator, and that reflects the amplified signal back along the first signal path through the first and second optical gain media; and
- a polarization shifter that is located along the first signal path to a side of the optical gain media away from the polarization separator, and that changes a polarization state of the optical signal a predetermined amount such that when the optical signal is directed toward the reflector from the polarization separator it has said first polarization state, and when the signal is returning to the polarization separator from the reflector it has said second polarization state.

32. An optical amplifier according to claim 31 wherein the optical signal has a wavelength of approximately 1550 nm.

33. An optical amplifier according to claim 32 wherein the first optical gain medium comprises an erbium doped fiber amplifier with a pumping source having a wavelength of approximately 980 nm.

34. An optical amplifier according to claim 32 wherein the second optical gain medium comprises an erbium/ytterbium doped fiber amplifier with a pumping source having a wavelength of approximately 1060 nm.

35. An optical amplifier according to claim 31 further comprising an optical isolator in an optical path between the optical signal source and the polarization separator.

36. An optical amplifier according to claim 31 wherein the first gain medium and the second gain medium each comprise non-polarization maintaining components.

37. An optical amplifier according to claim 31 wherein the polarization separator is a polarization beamsplitter.

38. An optical amplifier according to claim 31 further comprising a polarization maintaining component in an optical path between the optical signal source and the polarization separator.

39. An optical amplifier according to claim 31 further comprising a polarization maintaining component in the second signal path.

40. A optical signal generation apparatus for generating an amplified optical signal, the signal comprising a first wavelength and having a first linear polarization, the apparatus comprising:
- a fiber laser source comprising:
  - a first pumped optical gain medium that generates optical energy at the first wavelength;
  - a first periodic grating to a first side of the pumped optical gain medium, the first grating being highly reflective at the first wavelength;
  - a second periodic grating to a second side of the pumped optical gain medium, the second grating being partially reflective at the first wavelength; and
  - a polarization maintaining optical waveguide through which is coupled optical energy at the first wavelength from the second periodic grating, the waveguide limiting optical energy output by it to a first predetermined polarization state; and an optical amplifier comprising:

a polarization separator that receives the optical energy output by the waveguide and directs it along a first signal path as a first optical signal, the polarization separator directing signals having a second polarization state, different from the first polarization state, along a second signal path;

a second pumped optical gain medium that receives and amplifies the first optical signal;

a reflector that reflects the amplified first signal back through the fiber amplifier; and a polarization shifter that shifts the polarization state of the optical signal from the first polarization state to the second polarization state such that the signal directed toward the reflector from the polarization separator has said first polarization state, and the signal returning toward the polarization separator has said second polarization state.

41. An apparatus according to claim 40 wherein the optical signal has a wavelength of approximately 1550 nm.

42. An apparatus according to claim 41 wherein the first optical gain medium comprises an erbium doped fiber amplifier with a pumping source having a wavelength of approximately 980 nm.

43. An apparatus according to claim 41 wherein the second optical gain medium comprises an erbium/ytterbium doped fiber amplifier with a pumping source having a wavelength of approximately 1060 nm.

44. An apparatus according to claim 40 wherein the second optical gain medium comprises a doped double-clad optical fiber amplifier.

45. An apparatus according to claim 40 wherein the first gain medium and the second gain medium each comprise non-polarization maintaining components.

46. An apparatus according to claim 40 wherein the polarization separator is a polarization beamsplitter.

47. An optical amplifier for amplifying an optical signal from an optical signal source, the signal comprising a first wavelength and having a first polarization state, the amplifier comprising:

a unidirectional optical coupler that receives optical energy at a first port and directs it to a second port, the second port being connected to a first signal path and being such that, when optical energy is received at the second port from the first signal path, it is directed to a third port, and wherein optical energy received at the third port of the unidirectional optical coupler from the second port is output to a second signal path, and optical energy received at the third port from the second signal path is output to a fourth port;

a first pumped optical gain medium that receives and amplifies optical energy along the first signal path;

a first reflector that is located in the first signal path to a side of the optical gain medium away from the second port, and that reflects the amplified signal back along the first signal path through the first optical gain medium;

a first polarization shifter that is located along the first signal path to a side of the optical gain medium away from the second port, and that changes a polarization state of the optical signal a predetermined amount such that when the optical signal is directed toward the reflector from the second port it has said first polarization state, and when the signal is returning to the second port from the reflector it has said second polarization state;

a second pumped optical gain medium that receives and amplifies optical energy along the second signal path;

a second reflector that is located in the second signal path to a side of the second optical gain medium away from the third port, and that reflects the amplified signal back along the second signal path through the second optical gain medium; and a second polarization shifter that is located along the second signal path to a side of the second optical gain medium away from the third port, and that changes a polarization state of the optical signal a predetermined amount such that, when the optical signal is directed toward the second reflector from the third port it has said second polarization state, and when the signal is returning to the third port from the second reflector it has a third polarization state.

48. An optical amplifier according to claim 47 wherein the unidirectional optical coupler comprises an optical circulator.

49. An optical amplifier according to claim 47 wherein the optical signal has a wavelength of approximately 1550 nm, the first optical gain medium comprises an erbium doped fiber amplifier with a pumping source having a wavelength of approximately 980 nm, and the second optical gain medium comprises an erbium/ytterbium doped fiber amplifier with a pumping source having a wavelength of approximately 1060 nm.

50. An optical amplifier according to claim 47 wherein the unidirectional optical coupler comprises an optical circulator.

51. An optical amplifier according to claim 47 wherein the polarization state of the optical signal is a linear polarization state, and wherein the polarization shifter rotates the plane of linear polarization of the amplified first path optical signal by approximately 90%.

52. An optical amplifier according to claim 47 wherein the optical signal has a wavelength of approximately 1550 nm.

53. An optical amplifier according to claim 51 wherein the first optical gain medium comprises an erbium doped fiber amplifier with a pumping source having a wavelength of approximately 980 nm.

54. An optical amplifier according to claim 47 wherein the first gain medium comprises non-polarization preserving components.

55. An optical amplifier according to claim 47 further comprising a polarization feedback controller to which the optical signal output to the third port is directed, the feedback controller comprising:

a polarization state detection apparatus that monitors the optical signal directed from the third port, and provides a control signal indicative of the relative difference between the polarization state of the signal directed from the third port and a desired polarization state; and an input polarization controller that controls the polarization state of the signal directed to the first port of the optical coupler, the polarization controller receiving the control signal from the polarization state detection apparatus and adjusting the polarization state of the signal directed to the first port of the optical coupler until the control signal indicates that said relative polarization difference is substantially a minimum.

56. An optical amplifier according to claim 55 wherein the polarization state detection apparatus comprises a polarization beamsplitter.

57. An optical amplifier according to claim 56 wherein the polarization state detection apparatus further comprises a photodetector.

58. A method of amplifying a single-polarization optical signal, the method comprising:

inputting an optical signal having a first polarization state to a first stage polarization separator which directs the optical signal along a first path;

amplifying the optical signal in a first stage optical gain medium along the first path, the gain medium being constructed to have a relatively low noise figure;

reflecting the first path optical signal back through the gain medium with a first stage reflector;

shifting the polarization state of the first path optical signal by a predetermined amount with a first stage polarization shifter such that, upon return of the optical signal to the first stage polarization separator, the optical signal follows a second path out of the first stage polarization separator;

inputting the optical signal output along the second path to a second stage polarization separator that directs it along a second stage amplifier path;

amplifying the optical signal in a second stage optical gain medium along the second stage amplifier path, the second stage gain medium having a relatively high power output;

reflecting the optical signal back through the second stage gain medium with a second stage reflector; and shifting the state of polarization of the optical signal by a predetermined amount with a second stage polarization shifter such that, upon return of the optical signal to the second stage polarization separator, the optical signal follows an output path from said second stage polarization separator.

* * * * *

UNITED STATES PATENT AND TRADEMARK OFFICE
CERTIFICATE OF CORRECTION

PATENT NO.    : 6,049,415
DATED         : April 11, 2000
INVENTOR(S)   : Grubb et al.

It is certified that error appears in the above-identified patent and that said Letters Patent is hereby corrected as shown below:

<u>Column 13,</u>
Line 27, "having a relatively power" should read -- having a relatively high power --

Signed and Sealed this

Second Day of September, 2003

JAMES E. ROGAN
*Director of the United States Patent and Trademark Office*